United States Patent
Von Wedemeyer

(10) Patent No.: US 6,915,585 B2
(45) Date of Patent: Jul. 12, 2005

(54) SPIRIT LEVEL

(75) Inventor: Peter Von Wedemeyer, Annweiler (DE)

(73) Assignee: STABILA Messgerate Gustav Ullrich GmbH, Annweiler (DE)

(*) Notice: Subject to any disclaimer, the term of this patent is extended or adjusted under 35 U.S.C. 154(b) by 0 days.

(21) Appl. No.: 10/476,881

(22) PCT Filed: Jun. 4, 2002

(86) PCT No.: PCT/EP02/06068
§ 371 (c)(1),
(2), (4) Date: Nov. 14, 2003

(87) PCT Pub. No.: WO02/101330
PCT Pub. Date: Dec. 19, 2002

(65) Prior Publication Data
US 2004/0134082 A1 Jul. 15, 2004

(30) Foreign Application Priority Data
Jun. 11, 2001 (DE) .................... 201 09 656 U

(51) Int. Cl.⁷ ............................. G01C 9/00
(52) U.S. Cl. ......................... 33/374; 33/809
(58) Field of Search ................. 33/374, 296, 464, 33/809, 811

(56) References Cited

U.S. PATENT DOCUMENTS

| 717,193 | A | * | 12/1902 | Heghinian | 33/296 |
|---|---|---|---|---|---|
| 1,137,169 | A | | 4/1915 | Rudolff | |
| 2,270,227 | A | * | 1/1942 | Swanson et al. | 33/809 |
| 2,770,046 | A | * | 11/1956 | Wichmann | 33/811 |
| 2,909,839 | A | * | 10/1959 | Miller | 33/294 |
| 3,383,772 | A | | 5/1968 | Gardner et al. | |
| 3,526,040 | A | * | 9/1970 | Young | 33/809 |
| 3,648,378 | A | | 3/1972 | Thingstad et al. | |
| 3,818,598 | A | * | 6/1974 | Hershire | 33/494 |
| 4,099,331 | A | * | 7/1978 | Peterson et al. | 33/451 |
| 4,150,492 | A | | 4/1979 | Tracy | |
| 4,399,616 | A | | 8/1983 | Jansson | |
| 4,435,908 | A | * | 3/1984 | Semler, Jr. | 33/376 |
| 4,621,431 | A | * | 11/1986 | Fatool et al. | 33/809 |
| 5,249,365 | A | | 10/1993 | Santiago | |
| 5,433,011 | A | * | 7/1995 | Scarborough et al. | 33/376 |
| 5,577,327 | A | | 11/1996 | Archambault | |
| 5,915,810 | A | * | 6/1999 | Cameron | 33/809 |
| 6,047,478 | A | | 4/2000 | Sowers | |
| 6,293,023 | B1 | * | 9/2001 | Schooley | 33/374 |
| 6,637,120 | B2 | * | 10/2003 | Pustay | 33/374 |
| 6,640,455 | B1 | * | 11/2003 | Smothers | 33/374 |
| 6,658,752 | B1 | * | 12/2003 | Bonaventura, Jr. | 33/374 |

FOREIGN PATENT DOCUMENTS

| DE | 19605868 | 8/1997 |
|---|---|---|
| DE | 29922795 | 5/2000 |
| GB | 1155287 | 6/1969 |

* cited by examiner

Primary Examiner—Christopher W. Fulton
Assistant Examiner—Amy R. Cohen
(74) Attorney, Agent, or Firm—Dennison, Schultz, Dougherty & MacDonald

(57) ABSTRACT

A spirit level including first and second profile elements which can be displaced relative to one another in a telescopic manner and fixed relative to one another by means of a fixing element. In order to ensure that the first and second profile elements remain aligned with each other irrespective of their position, the first profile element is a hollow profile consisting of two sections which can be joined by means of the second profile element. The first section is joined to the second profile element and the second section can be moved along the remaining area of the second profile element. When the second profile element is at least partially uncovered by the second section, the second profile element can be subjected to the action of force in the direction of a profile wall of the second section of the first profile element.

30 Claims, 3 Drawing Sheets

SPIRIT LEVEL

Figure 1:
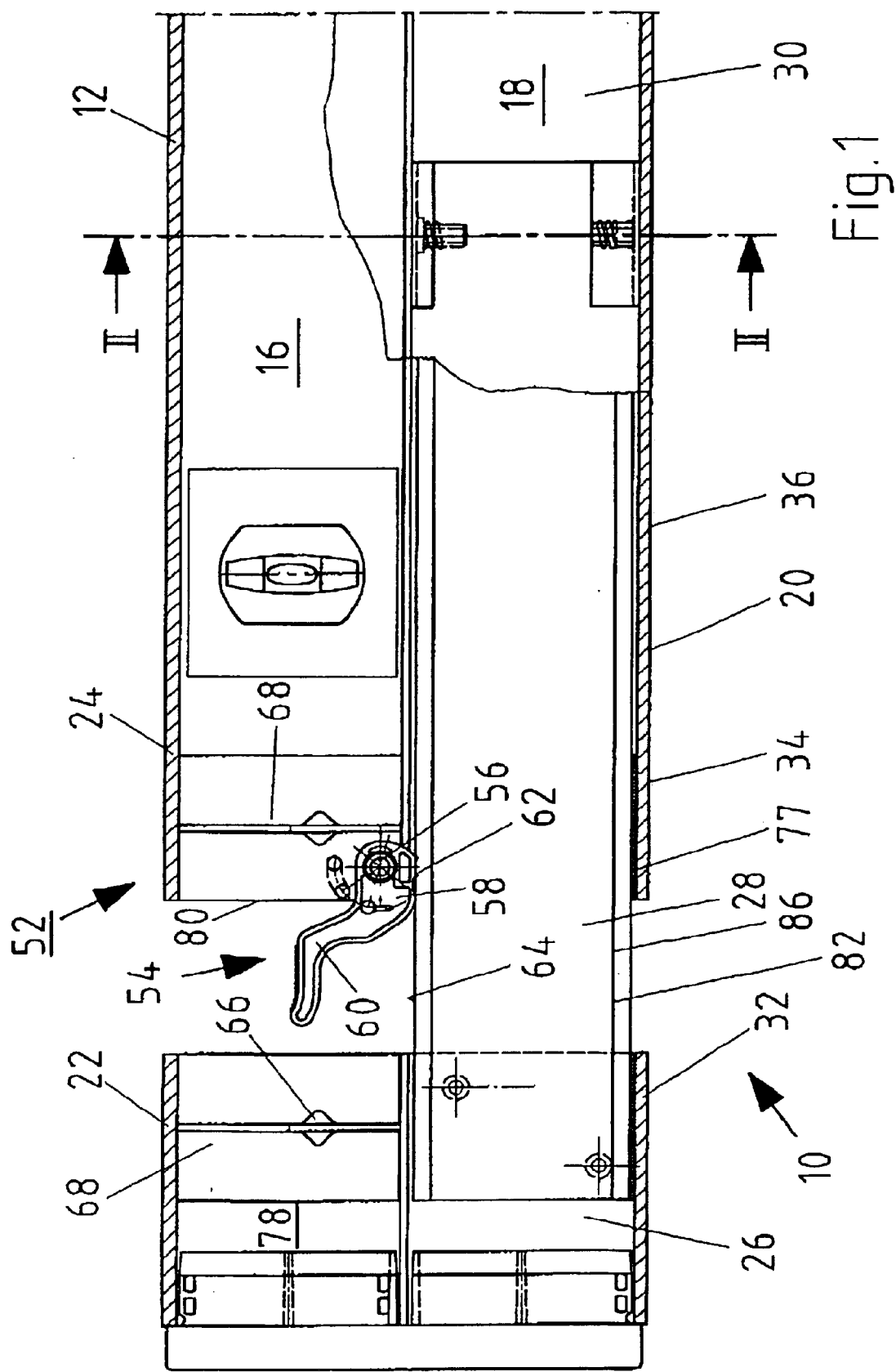

The invention relates to a spirit level comprising a first and a second profile element, which preferably can be displaced relative to one another in a telescopic manner, and are fixed relative to one another by means of a fixing element.

In U.S. Pat. No. 6,047,478 a telescoping spirit level is disclosed, wherein telescoping elements are aligned by means of an interlocking design. In accordance with U.S. Pat. No. 1,137,169, sections of a spirit level are pivoted relative to one another in order to achieve a desired length.

DE 196 05 868 relates to a spirit level that comprises a basic framework that holds an extension that can be displaced, wherein said extension is a solid profile element that is cruciform in its cross-section, and said element is arranged such that it can be displaced within a correspondingly shaped recess in the longitudinal body of the spirit level.

With the telescoping, extendable spirit levels known from DE 299 22 75 A1, profiles that can be displaced relative to one another are provided, which can be fixed relative to one another by means of locking bolts.

U.S. Pat. No. 5,249,349 relates to a telescoping spirit level comprising profile sections that extend coaxially relative to one another.

Other telescoping or extendable spirit levels are disclosed, e.g., in DE 75 23 018 U; DE 80 05 439 U; U.S. Pat. Nos. 3,104,477; 3,648,378; 5,412,875; 684,846; or CH 64 646 251 A5.

Known telescoping spirit levels are either costly to build or not sufficiently stable to satisfy customary requirements for spirit levels. Due to this fact, the disadvantage exists that when a spirit level is extended, the measuring beds or surfaces of the given ends may not be in alignment with one another.

For example, it is possible to use a spindle element to fix interlocking profile elements, in order to create a desired measuring length. In this, a T-shaped inner profile element can be arranged in an outer profile element comprised of a trapezoidal base section and a rectangular upper section so that only one outer surface can be used as a measuring surface (U.S. Pat. No. 3,648,378). Because the spindle element that fixes the profile elements relative to one another extends beyond the outer profile element, the danger exists that when a corresponding spirit level drops, the spindle element could be bent so that it cannot be used again.

One frequently proposed solution provides for outer profile elements that are connected to one another via round or square rods, in order to enable an adjustment of length (U.S. Pat. No. 3,104,477, CH 646 251, U.S. Pat. No. 5,412,875). This mode of connection via the profiled rods, however, frequently cannot guarantee the desired level of stability.

It is also possible for longitudinally divided profile elements to be joined to one another via a dovetail connection, making it possible to shift these elements relative to one another (U.S. Pat. No. 5,412,875).

Regardless of their design, the telescoping spirit levels generally exhibit the disadvantage that a measuring bed or surface that extends along a straight line and is continuous or essentially continuous, which frequently would be desirable, is not created.

The object of the present invention is to improve upon an extendable or telescoping spirit level of the type described at the beginning such that with a simple construction, a rigid connection between sections that can be displaced relative to one another is created, with the object of ensuring that the measuring beds or surfaces of the individual sections are always oriented along a straight line, in alignment with one another, independent of the length of the spirit level. Further, it is to be made possible to use a continuous or essentially continuous measuring surface or bed, independent of the length of the spirit level.

The object is essentially attained in accordance with the invention in that the first profile element is a hollow profile element comprised of first and second sections that can be joined by means of the second profile element, in that the one, first section is firmly joined to one end of the second profile element, and in that the other, second section can be displaced along the remaining area of the second profile element, wherein, when the second profile element is at least partially uncovered by the second section, the second profile element can be subjected to the action of force in the direction of a profile wall of the second section, wherein the action of force is to be applied especially in areas that are distanced from one another. In this, the force is to be applied especially via a fixing element, which is completely covered by the first profile element, in other words it extends inside the hollow profile element, when the first and second sections of the first profile elements abut against one another, in other words when the spirit level is not telescoped.

According to the invention, in the first profile element, which is designed as a hollow profile element, a second profile element, also especially in the form of a hollow profile element, is guided, wherein said second element can be subjected to the action of force in the direction of a profile wall of the first profile element or outer profile element in such a way that the profile elements are aligned parallel to one another along their longitudinal axes, with the result that the measuring beds or surfaces of the first section of the first profile element are oriented in alignment with one another, independent of the actual length of the spirit level.

In this manner, the fixing element serves a dual function to the extent that the first profile element is fixed in relation to the second profile element at the desired extended length of the spirit level, while at the same time the second profile element or inner profile element is subjected to an action of force by means of the fixing element in the direction of the inner surface, especially of the profile wall, which on the outside forms the measuring bed or surface.

In order to ensure the parallel alignment of the second profile element to the first profile element, the first element is subjected to an action of force at a distance from the fixing element, especially in the end area of the second profile element, in the direction of the corresponding profile wall of the first profile element. Preferably, force is applied to the second profile element in at least three areas in the direction of the profile wall of the first profile element.

The fixing element can be a clamping element such as a spindle element, a quick-release element, or especially an eccentric lever, which in turn is equipped with an extended actuating arm or lever for pivoting the lever, which, in the position that fixes the second profile element to the first profile element, extends beyond the open end surface of the second section that faces the first section.

The eccentric element is clamped when the second profile element has been drawn out of the first profile element to the desired extent.

In order to ensure that the force being applied by the eccentric lever to the second profile element will be halted if the profile elements should accidentally be pushed together as a result, e.g., of a drop of the spirit level, a further development of the invention provides that a stop element that serves to pivot an arm of the eccentric lever extends a certain distance from the open end surface of the first section of the first profile element that faces the first section. This stop element causes the eccentric lever to be automatically shifted from its fixed position to its opened position when the arm is pressed up against the stop element.

In this, the stop element can protrude from an insert positioned in the first section, which is an element that is H-shaped in its cross-section, especially an injection molded plastic element. To promote the simple manufacturing of the insert, it should be comprised of two identical sections, each of which is T-shaped in its cross-section, so that when the insert is assembled the center bars form the crossbar of the H-shaped profile element.

The hollow profile element that forms the first profile element is divided into at least two longitudinal chambers, wherein the second profile element extends in the one, first chamber, and the clamping element is housed in the other, second longitudinal chamber. Furthermore, an insert can be positioned in the second longitudinal chamber of the section that can be pivoted relative to the second profile element, with said insert corresponding to the insert in the first section, and holding the stop element for the actuating arm of the eccentric lever. In this manner, the cross-section of the second longitudinal chamber is closed off by the crossbar of the H-shaped profile element, so that the depositing of contaminants in the second longitudinal chamber of the sections is largely excluded.

The eccentric lever, which is positioned in the second longitudinal chamber such that it can pivot, is comprised especially of a base section through which the pivoting axis extends, and the actuating arm or lever that extends from it. In this, when the eccentric lever is clamped, the base section extends through an intermediate wall that separates the first longitudinal chamber from the second longitudinal chamber, allowing it to operate in conjunction with the second profile element. To this end it is especially provided that when the eccentric lever is in its clamped position, an outer surface of it extends along the second profile element, and is supported against it directly and/or at least against a projection that protrudes from the outer surface of the eccentric lever.

In a further development of the invention it is proposed that at least one pressure element should operate in conjunction with the second profile element to promote its application of force in the direction of the profile wall such as the profile outer wall, with this pressure element being supported on one side against the separating wall and on the other side against the second profile element.

To this end it is provided in particular that the second profile element is a hollow profile element, that the second profile element is covered at least partially on the side of its inner wall by a cap that is equipped with a projection that protrudes into the inside of the second profile element and holds a spring element, which is supported at one end on the inside against the cap and at the other end indirectly or directly against the opposite wall of the second profile element or its inner surface. In this manner, the wall of the second profile element to which force is being applied can be supported against the inner surface of the profile wall of the first profile element by means of a sliding element. In this, a corresponding sliding element is found in all areas in which force is applied to the second profile element in the direction of the first profile element.

One proposal of the invention also provides for the second profile element to be supported in relation to the first profile element by means of ball indentation components, via which the desired application of force between the profile elements necessary to enable the parallel alignment of their longitudinal axes is achieved, wherein especially the longitudinal chamber that holds the second profile element is the first longitudinal chamber, and extends on the side of the measuring beds or surfaces.

One proposal of the invention, which is protected independently, provides that, in order to create a continuous or essentially continuous measuring bed or surface, a band or belt element extends between the measuring bed or surface of the first and second sections of the first profile element along the outer surface of the second profile element that runs between said sections, with said band or belt element extending on the outer side in alignment with the adjacent measuring beds or surface sections. In this, the band element can be prestressed by means of a spring, and especially can be guided within the second profile element by means of guide rollers.

To fix the band element on the outer surface of the second profile element, one preferred embodiment of the invention provides for the band element to be magnetically fixed to the outer surface. To this end, the side of the band or belt element that faces the profile element can be made of a ferrous material, and the second profile element can be equipped with magnets oriented toward its outer surface.

According to the invention, a band or belt is provided that is calibrated and has a material thickness that is sufficient to fill the empty space between the outer surface of the second or inner profile element and the measuring beds or surfaces of the first and second sections of the first profile element or outer profile that border the edges of the second or inner profile element. In this, the band or the belt is preferably fixed by means of magnets that are provided in the second profile component, whereby the precision of a measurement is improved. Of course it is also possible for the band or belt to be guided in a type of dovetail guide that is provided in the outer surface area of the second profile element. Other possible solutions are also conceivable.

The band or the belt can be guided around a roller in the area of the first section of the first profile element or in the end area of the second profile element that is joined to the first profile element, and preferably can be clamped and rolled either at the opposite end of the second profile element or in the first profile element by means of a clamping element such as a roller that is preloaded by means of a spring. If necessary, a tension spring element is sufficient, which will tense the band to the required extent. A proposal is also possible in which the band length would remain the same.

The band or belt can be made of a plastic mesh material, or some type of driving belt that has a ferrous base. Alternatively, the possibility also exists of using a steel band that is vulcanized on at least one side with rubber.

According to a further proposal, one or more sliding elements can be arranged along the inner profile such that they can be displaced lengthwise, wherein its or their sections that extend along the outer surface of the second profile element have a thickness that offsets the height to the distance between the outer surface and the measuring bed or surface of the first and second sections of the first profile element.

Further details, advantages, and characterizing features of the invention are disclosed not only in the claims, the features contained therein—alone or in combination—, but also in the following description of the exemplary embodiments disclosed in the drawings.

Figure 2:
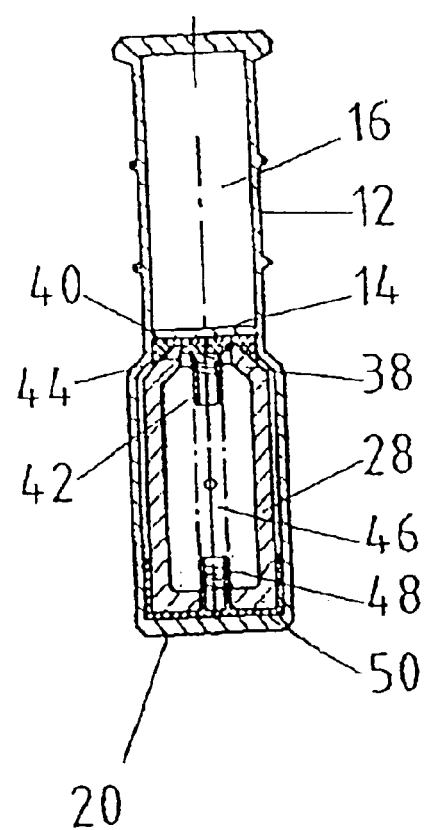
Figure 3:
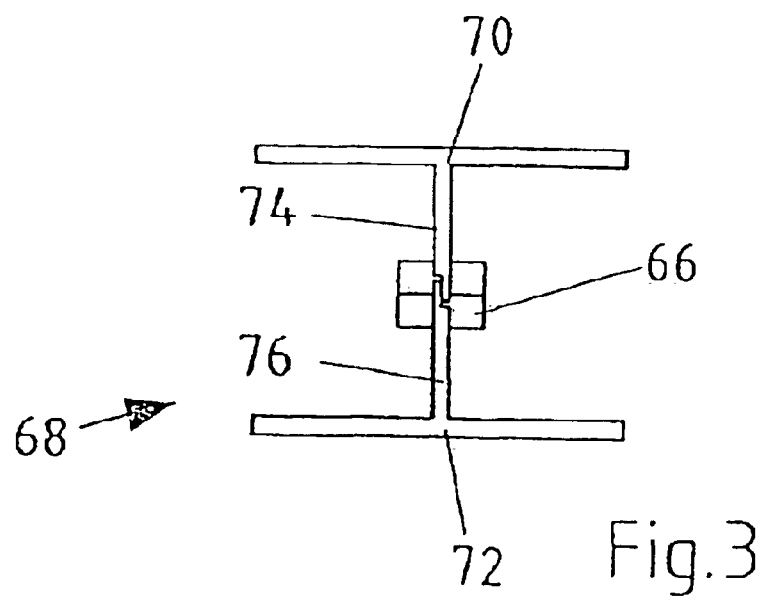

These show:

FIG. 1 a longitudinal section of a spirit level, partially broken,

FIG. 2 a cross-section of the spirit level along the Line II-II in FIG. 1,

FIG. 3 an insert, and

Figure 4:
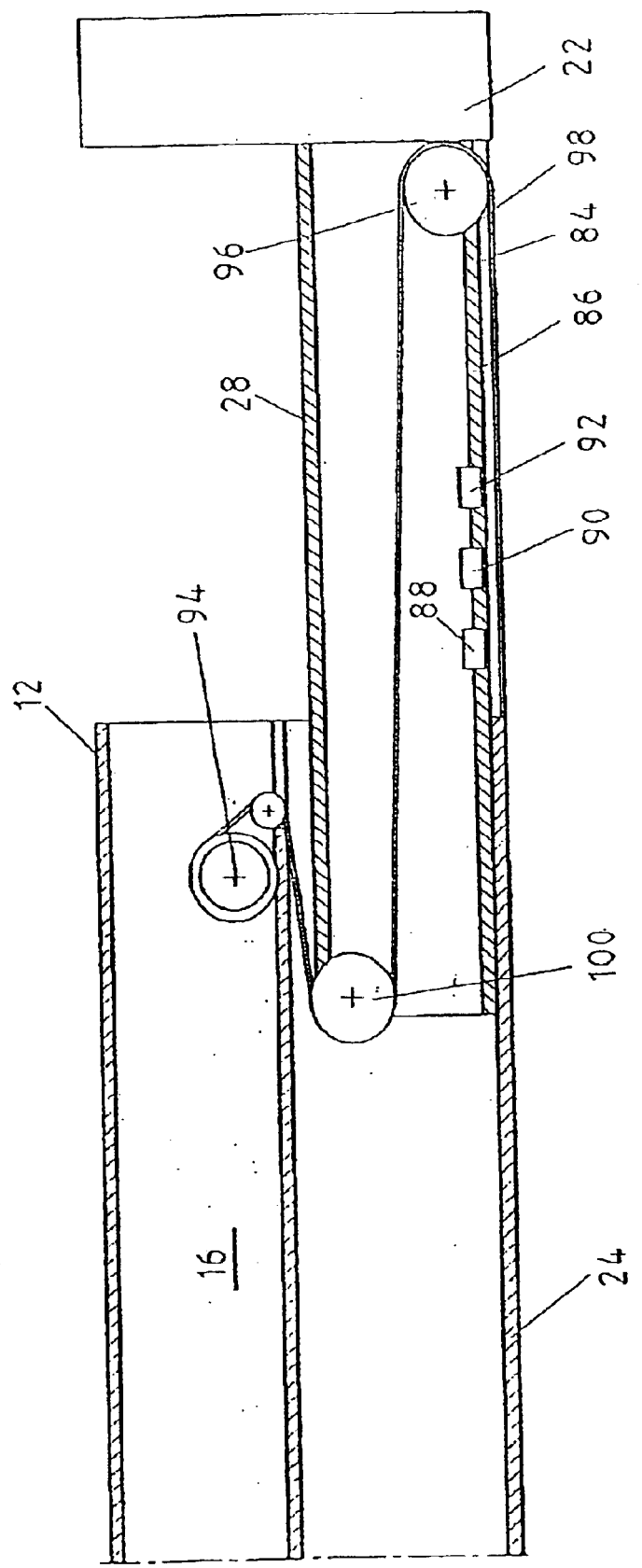

FIG. 4 a representative illustration of a further improvement on the spirit level shown in FIG. 1.

In FIG. 1, a telescoping spirit level 10 is illustrated purely in principle, which is comprised especially of metal, although it may also be comprised of other suitable materials such as plastic. In this, essentially only the features that characterize the invention are depicted, without other functional elements such as spirit levels being included.

In accordance with the invention, the spirit level 10 is designed to be telescoping, in other words extendable, in order to make a desired length available to correspond to specific applications. Independent of this, the spirit level in a non-extended state may have a length, e.g., of 120 cm or 200 cm, in order to provide an effective overall length, e.g., of 200 cm or 350 cm in a maximally extended state. These figures, however, are provided purely by way of example, without serving thereby to limit the teaching of the invention.

The spirit level 10 is comprised of a first profile element 12, which is an outer profile element and is divided by a dividing wall 14 into a first, in the drawing upper, longitudinal chamber 16 and a second lower longitudinal chamber 18, the outer, base-side surface of which forms the measuring bed or surface 20.

In the partial illustration shown in FIG. 2, the upper chamber 16 is narrower in width than the lower longitudinal chamber 18, however, other dimensions may also be chosen.

The first profile element 12 or outer profile is divided into two sections 22, 24, wherein in the second or lower longitudinal chamber 26 of the shorter section 22 a second profile element 28, also designed as a hollow profile element, is fixed, which extends inside the lower or second longitudinal chamber 18 of the second section 24 of the first profile element 12 such that said element can be shifted longitudinally along the second profile element 28, in order thus to be able to adjust the desired effective overall length for the spirit level 10. In addition, if desired, dimension indicators for confirming the effective length of the spirit level 10 can be provided on at least one outer surface of the second profile element 28.

In order that the measuring bed 20 or the areas 32, 34 that extend on the base from the sections 22, 24 of the first profile element 12 will extend in alignment along a common line, and the sections 22, 24 can be fixed at the desired distance from one another, independent of the length of the spirit level 10, in other words the distance between the sections 22, 24 of the first profile element 12, the proposed solutions according to the invention are provided below, each of which is considered inventive in its own content.

In order to ensure a parallel orientation of the longitudinal axis of the second profile element 22 to the longitudinal axis of the first profile element 12, and thus to the second longitudinal chamber 18, the second profile element 28 is subjected to an action of force in the direction of the base wall 36 that holds the measuring bed or surface 20, 22, 34 on its outside, resulting in a parallel orientation of the profile elements 12, 28 relative to one another.

The corresponding application of force of the second profile element 22 in the direction of the base wall 36 of the first profile element 12 can be achieved, e.g., by means of ball indentation elements, not illustrated here, that would act between the dividing wall 14 between the first profile element 12 and the second profile element 28.

In accordance with the diagrammatic representation, however, other realizations are also possible. For instance, the second profile element 28 is equipped on the side of the dividing wall with a header section 38 that is trapezoidal in its cross-section, along the outer side of which a cap piece 40, especially made of plastic, extends, the geometry of which corresponds to that of the cross-section of the longitudinal chamber 18 in the area on the side of the dividing wall 14, as is clarified in the sectional illustration in FIG. 2.

The cap piece 40 extends with a cylindrical projection 42 through an opening 44 in the second profile element 28 and is enclosed by a spring element such as a coil spring 46, which is supported on the inner surface in the base area of the second profile element 28. For fixing purposes, the coil spring element 46 coaxially encompasses an inner projection 48, which itself extends from a sliding element 50 that is U-shaped in its cross-section and extends between the inner surface of the base-side or lower longitudinal chamber 18 and the adjacent outer surface of the second profile element 28, in order thus to enable a frictionless shifting of the second profile element 28 relative to the first profile element 12.

Irrespective of this, the spring element acts directly on the cap piece 40 or the cover, and thus supports itself indirectly against the intermediate wall 14, in other words against the first profile element 12. On the opposite side, it is directly supported against the second profile element 28, so that as a result said element continuously experiences force in the direction of the base wall 36, creating a parallel orientation of the second profile element 28 to the first profile element 12, so that the sections 32, 34 of the measuring bed or surface 20 are continuously in alignment with one another, independent of the distance between the sections 22, 24 of the first profile element 12.

In particular it is provided that the second profile element 28, in its end area that extends inside the second section 24 of the first profile element 12, is acted upon by force by means of two supports that are distanced from one another, in order to achieve the required orientation. In addition, in the open end area 52 of the second section 24 of the first profile element 12 an additional application of force of the second profile element 28 in the direction of the base wall 36 of the first profile element 12 takes place, specifically when the first and second profile elements 12, 28 are fixed relative to one another.

This fixing or fastening is accomplished via a clamping element, which can basically be of known design, in other words its construction can be that of a spindle or a spring-loaded clamping element. According to the invention, however, the clamping element is designed as an eccentric lever 54, which is mounted in the first profile element 12, specifically in its upper longitudinal chamber 16, such that it can pivot around an axis 56. The axis 56 extends through a base section 58 of the eccentric lever 54 that is oval or elliptical in its cross-section, from which a pivoting or actuating arm or lever 60 extends, by means of which the eccentric lever 54 can be pivoted into the position in which the second profile element 28 is fixed (see FIG. 1), or—in keeping with the representative drawing—is released by pivoting the lever clockwise.

When fixing the second profile element 28, the base section 58, with a surface 62 or with projections that extend from said surface and are not further characterized here and which enable a balancing of tolerances, rests on the outer surface 64 of the second profile element 28 that extends on the side of the dividing wall 40, such that the necessary application of force by the second profile element 28 takes place in the direction of the base wall 36 of the first profile element 12. In addition, in the area of the application of force between the second profile element 28 and the inner surface of the base wall 36 a sliding element 77 extends, whose thickness in the area of the base wall 36 corresponds to that of the sliding element 50 shown in FIG. 2, so that as a result the second profile element 28 continuously extends at the same distance from the inner surface of the base wall 36 of the first profile element 12, thus ensuring that with proper application of force a parallel orientation of the longitudinal axis of the second profile element 28 to that of the first profile element 12 is provided.

In order to ensure that if the sections 22, 24 should accidentally be pushed together in an uncontrolled fashion, e.g. as a result of a drop of the spirit level 10, while the eccentric lever 54 remains in a locked position, said lever will be released, a projection 66 extends in the displacement path of the pivoting or actuating arm 60 from an insert 68 that is positioned in the first or upper longitudinal chamber 16 of the section 22 of the first profile element 12.

In this way, if the arm 60 interacts with the projection 66, the eccentric lever 54, as shown in the representative drawing, is pivoted clockwise, whereby the second profile element 28 is released and thus can be displaced to the desired extent inside the base-side longitudinal chamber 18.

The insert 68 is H-shaped in cross-section and is comprised of two T-shaped profile sections 70, 72, which are identical in design and are assembled in accordance with the representative illustration in FIG. 3.

The center bars 74, 76 of the T-profile sections 70, 72 form the cross-bar of the H-shaped insert 68, and close off the cross-section of the longitudinal chamber 16, i.e. its area 78 in the second section 22 of the first profile element 12. A corresponding insert 68 can also be provided, distanced from the open end surface 80 of the second section 24 of the first profile element 12, as is clarified in the sectional illustration shown in FIG. 1. In this, the pivoting axis 56 of the eccentric lever 54 extends between the open end surface 80 and the crossbar of the insert 68 that is formed by the center bars 74, 76.

Of further importance is that the clamping element, in this case the eccentric lever 54, extends completely inside the upper longitudinal chamber 16 when the spirit level 10 is not extended, in other words when the sections 22, 24 of the first profile element 16 abut against one another, so that protection is provided.

When the first and second sections 22, 24 of the first profile element 12 are distanced somewhat from one another, the measuring surface or bed 20, 32, 34 in the area of the freely accessible second profile element 28, that is in the area 82 in FIG. 1, is interrupted. Hence, no continuous measuring bed or surface 20 is available.

In accordance with the invention, it is now provided that the corresponding area 82 can be covered by a band or belt element 84, the effective thickness of which corresponds to the distance between the open outer surface 86 of the second profile element 28 and the outer surface, in other words the measuring bed or surface 20, 32, 34 of the first profile element 12. The belt element 84 can be comprised on the side of the profile element, e.g., of ferrous material, in order that it may be fixed as necessary on the outer surface 86 of the second profile element 28 by means of magnets 88, 90, 92 attached thereto. Other means of attachment, e.g. a dovetail guide between the belt or band element 84 and the second profile element 28, are also possible.

In order that the open outer surface 86 of the second profile element 28 can be covered by the belt 84, independent of the distance between the sections 22 and 24 of the first profile element 12, the belt extends in a corresponding length inside the second profile element 28 and can be rolled onto a clamping element such as a roller 94 that is preloaded by means of a spring, which—as in the exemplary embodiment—is fixed in the first profile element 12, i.e. its upper longitudinal chamber 16. Of course, the clamping element 94 can also be fixed in the end area of the second profile element 28 that extends in the second section 24. Independent of this, the belt element 84 is diverted over a roller 96 in the area of the first section 22 of the first profile element 12, wherein the band element 84 is guided into the inside of the second profile element 28 through a slot 98.

In the exemplary embodiment, the belt 84 is diverted over a total of two guide rollers, each of which is mounted such that it can rotate in an end area of the second profile element 28.

In place of the belt 84, one or more sliding elements that can be pushed or clipped on can also be attached to the second profile element 28, the bed-side surfaces of which would extend in alignment with the measuring beds or surface sections 32, 34.

What is claimed is:

1. Spirit level (10) comprising a first and a second profile element (12, 28), which can be displaced relative to one another in a telescopic manner and can be fixed relative to one another by means of a fixing element (56), wherein the first profile element (12) is a hollow profile element, characterized in that the first profile element (12) is divided into a first and a second longitudinal chamber (16, 18), in that the first profile element is comprised of a first and a second section (22, 24), which are joined to one another via the second profile element (28), in that the second profile element is firmly joined to the first section and the second section can be displaced along the second profile element, in that a clamping element (54) is part of the fixing element (56) and extends from the first longitudinal chamber and extends into a second longitudinal camber of the first profile element, wherein, when the second profile element is at least partially uncovered by the second section, the second profile element can be subjected to the action of force by means of the clamping element in the direction of a profile wall (36) of the second section of the first profile element, and the second profile element can be fixed to the second section of the first profile element.

2. Spirit level according to claim 1, characterized in that an action of force is applied to the second profile element (28), which is designed in particular as a hollow profile, by means of a fixing element (54), in the direction of the profile wall (36) of the first profile element (12).

3. Spirit level according to claim 1, characterized in that the fixing element is a clamping element such as a spindle element, a quick-release element, or especially an eccentric lever (54).

4. Spirit level according to claim 1, characterized in that when the second profile element (28) extends completely inside the sections (22, 24) of the first profile element (12), the fixing element (54) is completely or essentially completely covered by the first profile element.

5. Spirit level according to claim 1, characterized in that when the second profile element (28) extends completely inside the sections (22, 24) of the first profile element (12), the sections of the first profile element transition into one another in alignment on the outside.

6. Spirit level according to claim 1, characterized in that the eccentric lever (54) is comprised of a base section (58) through which the pivoting axis (56) that extends from the first profile element (12) passes, and an actuating arm or lever (60) that extends from said base section.

7. Spirit level according to claim 1, characterized in that the second profile element (28) extends in one, first chamber (18), and in that the eccentric lever (54) is housed in the other, second longitudinal chamber (16).

8. Spirit level according to claim 1, characterized in that the base section (58) of the eccentric lever (54) in its clamped position passes through an intermediate wall (14) that separates the first longitudinal chamber (18) from the second longitudinal chamber (16), for the purpose of interacting with the second profile element (28).

9. Spirit level according to claim 1, characterized in that an outer surface (62) of the eccentric lever (54), when said lever is in the clamped position, is supported against the outer surface (64) of the second profile element (28) on the side of the dividing wall, directly and/or at least against a projection that protrudes from the surface.

10. Spirit level according to claim 1, characterized in that when the eccentric lever (54) is in the position in which the second profile element (28) is subjected to an action of force, the actuating arm (60) of the lever extends over the open end surface (80) of the second section that faces the first section (22) of the first profile element (12).

11. Spirit level according to claim 1, characterized in that a stop element (66) that pivots the actuating arm (60) of the eccentric lever (54) extends, distanced from the open end surface of the first section (22) that faces the second section (24) of the first profile element (22).

12. Spirit level according to claim 1, characterized in that the stop element (66) extends from an insert (68) that is positioned in the first section (22).

13. Spirit level according to claim 1, characterized in that an insert (68) is an element that is H-shaped in its cross-section, especially an injection molded element.

14. Spirit level according to claim 1, characterized in that an insert (68) is comprised of two identical components (70, 72), each of which is T-shaped in its cross-section.

15. Spirit level according to claim 1, characterized in that an insert (68) is positioned in each second longitudinal chamber (16, 78) of the sections (22, 24) of the first profile element (12), which serves to close off the open cross-section of the second longitudinal chamber.

16. Spirit level according to claim 1, characterized in that at least one pressure element operates in conjunction with the second profile element (28) to achieve an application of force in the direction of the profile wall such as the profile outer wall (36) of the first profile element (12).

17. Spirit level according to claim 1, characterized in that a pressure element (46) is supported on one side against the dividing wall (14) of the first profile element (12) and on the other side against the second profile element (28).

18. Spirit level according to claim 1, characterized in that the second profile element (28) is a hollow profile element, and in that the second profile element is covered on the side of the dividing wall at least partially by a cap-shaped element (40), which is fitted with a projection (42) that extends into the inside of the second profile element (28), from which projection a spring element such as a coil spring (46) extends, which is supported at one end on the inside against the cap-shaped element and at the other end indirectly or directly against a wall (86) of the second profile element (28) that extends directly along the profile outer wall (36) of the first profile element (12), or the inner surface of the second profile element.

19. Spirit level according to claim 1, characterized in that the wall (86) of the second profile element (28) that is subjected to the action of force is supported against the inner surface of a profile wall (36) of the first profile element (12) by means of a sliding element (50, 66).

20. Spirit level according to claim 1, characterized in that the second profile element (28) is supported against the first profile element (12) by means of at least one ball indentation element.

21. Spirit level according to claim 1, characterized in that the longitudinal chamber (18) that houses the second profile element (28) extends on the side of the measuring bed or surface.

22. Spirit level according to claim 1, characterized in that in order to form a continuous or essentially continuous measuring bed or surface (20, 32, 34) for the spirit level (10), at least one element extends between an open outer surface (82) of the second profile element (28), which extends on the side of the measuring bed or surface, and the first and second sections (22, 24) of the first profile element (12), wherein the outer surface of said element is oriented in alignment with the measuring bed or surface of the first and second sections, or extends toward said bed or surface.

23. Spirit level according to claim 1, characterized in that a element that extends on the outside in alignment with measuring bed or surface (20, 32, 34) is a band or belt element, which extends in particular preloaded by means of a spring, at least in sections, inside the second profile element (28).

24. Spirit level according to claim 1, characterized in that a band or belt element (84) extends inside the second profile element (28), guided over at least one guiding roller (96, 100).

25. Spirit level according to claim 1, characterized in that a band or belt element (84) can be magnetically fixed to an open outer surface (82) of the second profile element (28).

26. Spirit level according to claim 1, characterized in that a band or belt element (84) contains ferrous material on the side of the profile element, or is provided with said material, and in that magnets (88, 90, 92) extend from the second profile element (28), oriented on its open outer surface (82).

27. Spirit level according to claim 1, characterized in that a belt or band element (84) is diverted in the second profile element (28) in the area of the first section (22) of the first profile element (12), and is preferably fixed at its end by means of a clamping element such as a winding roller (94), which extends from the second or the first profile element (12, 28).

28. Spirit level according to claim 1, characterized in that along a open outer surface (82) of the first profile element (28) at least one sliding element is arranged such that it can be displaced longitudinally, wherein a thickness of the section that can be displaced on the outer surface is equal to the effective distance between the outer surface and a measuring bed or surface (20, 32, 34) of the first and second sections (22, 24) of the first profile element (12).

29. Spirit level according to claim 1, characterized in that the second profile element (28) is subjected to an action of force in areas that are distanced from one another relative to the first profile element (12).

30. Spirit level according to claim 1, characterized in that a dividing wall (14) that separates the first hollow profile element (12) into the first and second longitudinal chambers (16, 18) is solid or is formed by sections that are distanced from one another, such as bridges.

* * * * *